(12) United States Patent
Peterson

(10) Patent No.: US 8,719,245 B2
(45) Date of Patent: May 6, 2014

(54) QUERY TEMPLATES WITH FUNCTIONAL TEMPLATE BLOCKS

(75) Inventor: Trenten Peterson, Florence, TX (US)

(73) Assignee: International Business Machines Corporation, Armonk, NY (US)

(*) Notice: Subject to any disclaimer, the term of this patent is extended or adjusted under 35 U.S.C. 154(b) by 950 days.

(21) Appl. No.: 12/131,263

(22) Filed: Jun. 2, 2008

(65) Prior Publication Data

US 2009/0299986 A1 Dec. 3, 2009

(51) Int. Cl.
*G06F 17/30* (2006.01)
*G06F 7/00* (2006.01)

(52) U.S. Cl.
USPC .......................................... 707/706; 707/769

(58) Field of Classification Search
CPC ..................... G06F 17/30392; G06F 17/30572; G06F 17/30991
USPC ................... 707/769, 706; 717/100
See application file for complete search history.

(56) References Cited

U.S. PATENT DOCUMENTS

| | | | | |
|---|---|---|---|---|
| 5,418,950 | A * | 5/1995 | Li et al. | 715/781 |
| 5,485,618 | A * | 1/1996 | Smith | 715/710 |
| 6,026,233 | A * | 2/2000 | Shulman et al. | 717/113 |
| 6,111,574 | A * | 8/2000 | Meek | 715/835 |
| 6,163,879 | A * | 12/2000 | Mackey | 717/111 |
| 6,430,556 | B1 * | 8/2002 | Goldberg et al. | 707/999.004 |
| 6,694,321 | B1 * | 2/2004 | Berno | 1/1 |
| 6,862,589 | B2 * | 3/2005 | Grant | 707/779 |
| 7,363,581 | B2 * | 4/2008 | Parks et al. | 715/235 |
| 7,421,660 | B2 * | 9/2008 | Charnock et al. | 715/751 |
| 7,707,218 | B2 * | 4/2010 | Gocht et al. | 707/758 |
| 7,890,957 | B2 * | 2/2011 | Campbell | 719/313 |
| 2004/0153456 | A1 * | 8/2004 | Charnock et al. | 707/10 |
| 2005/0015363 | A1 * | 1/2005 | Dessloch et al. | 707/3 |
| 2006/0036603 | A1 * | 2/2006 | Laney | 707/9 |
| 2007/0005562 | A1 * | 1/2007 | Chau et al. | 707/2 |
| 2007/0073853 | A1 * | 3/2007 | Azizi et al. | 709/220 |
| 2008/0066080 | A1 * | 3/2008 | Campbell | 719/314 |

OTHER PUBLICATIONS

Scalzo et al., TOAD Handbook, Feb. 21, 2003, Sams, ISBN 0-672-32486-5; Cover Page.*
Scalzo et al., TOAD Handbook, Feb. 21, 2003, Sams, ISBN 0-672-32486-5; pp. 1-13.*
Scalzo et al., TOAD Handbook, Feb. 21, 2003, Sams, ISBN 0-672-32486-5; pp. 14-18.*

* cited by examiner

*Primary Examiner* — Pavan Mamillapalli
(74) *Attorney, Agent, or Firm* — Sawyer Law Group, P.C.

(57) ABSTRACT

A computer program product and method of visual cues is provided through the use of query templates with functional template blocks to assist in building queries by giving visual cues about valid options, expected constructs, and required syntax. The one or more visual cues each have one or more of a valid option, expected construct, and required syntax. The invention provides a graphic user interface display to assist a builder in query creation.

10 Claims, 5 Drawing Sheets

400

QUERY TEMPLATES WITH FUNCTIONAL TEMPLATE BLOCKS

BACKGROUND OF THE INVENTION

1. Field of the Invention

The present invention relates to computer program products and methods for database queries, and more particularly, the present invention relates to a computer controlled display system for displaying and generating visual cues on a graphic user interface of a display for query creation.

2. Description of Related Art

Crafting and creating well-developed queries is a challenge for even the most experienced programmers. In part, this challenge arises due to unfamiliar query constructs, query syntax and query construction logic it is understood that query constructs include all of the functions and expressions that can be used to build a query. For instance, it is understood that the SQL CONSTRUCT QUERY statement constructs an SQL statement text string from a list of data items and literal values. Query syntax is understood as the rules determining how the constructs can be combined to create a query. Query construction logic is required to combine query constructs using query syntax in a meaningful way, so that the query, when well-developed, returns the desired result.

Today, queries are often developed with the aid of existing query building tools. Most of these tools are reasonably suited for the intermediate to advanced users and programmers, but many are often difficult to use without substantial instruction and practice. Tools such as those utilizing "content assistance" do offer non-advanced users improved opportunity over standard tools as these types of tools attempt to provide a builder of queries options as the query is built. FIG. 1 presents a drop-down window display of a tool exemplar using the content assistance (i.e., content assist).

From FIG. 1 a display 100 is presented to a user which provides content-directed assistance in displaying of valid code listings. At 110 a "Customer" object is presented with valid code options (e.g., named, id), and at 120 the identity of the customer, from getID, is presented with options. FIG. 1 illustrates how content assist displays complex and primitive return types, such as integers and classes, as well as modeling elements and diagrams, for some typically tools. For instance, in another example, if the name of a property is typed, and then a colon (:) is typed, a list of all possible return value is presented. In operation, some of the content assist tools will attempt to complete the query builder's code as the query is being typed as well.

While the content assist tools are helpful they also prove insufficient to adequately accommodate query building needs. One challenge in the use of typical content assist tools is that a builder is required to invoke the content assistance in the tool before it can be used. In order to invoke the content assistance, the builder must first know of where or what is missing from the build exercise or in the content of the build. This in essence requires a builder to know what assistance the content assist tool may be able to provide in order to know how to obtain that assistance from the tool itself. Unfortunately, the knowledge of what and where to obtain the necessary information itself presents a challenge, as such requires a skill set that the novice builder often does not possess and thereby prevents the builder from obtaining the help needed from the content assist tool.

It is therefore desirable to provide a computer program product and method for automatically displaying and generating visual cues having valid options, expected constructs, and required syntax via query templates with functional template blocks on a graphic user interface of a display to assist a builder in query creation.

SUMMARY OF THE INVENTION

The present invention relates generally to query templates with functional template blocks to assist in building queries by giving visual cues about valid options, expected constructs, and required syntax.

In accordance with the present invention, there is provided a computer program product and method of providing query templates having one or more functional template blocks to assist in building one or more queries, the method comprising: providing for displaying one or more visual cues on a display, the one or more cues each having one or more of a valid option, expected construct, and required syntax; providing for presenting one or more keywords to the display, providing for highlighting at least one required template block in the display via one or more of a form or physical factor distinction; and, providing for a capability to receive a response to the one or more functional template blocks; wherein each functional template block includes at least one required template block associated with the one or more queries.

As used herein, the term "template" is understood to include one or more "template blocks" preferably for optional or required query code. The "template blocks" are understood to be "smart" place-holders for optional or required query code. The template blocks then are "smart" in that they are capable of "knowing" the builder and are able to communicate to the builder, the query constructs and query syntax that they are place-holders for, such that the template blocks may be replaced therewith.

DETAILED DESCRIPTION OF PREFERRED EMBODIMENTS

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides a method and apparatus of providing for query templates with functional template blocks to assist in building queries by giving visual cues about valid options, expected constructs, and required syntax.

In one implementation, the present invention provides for visual cues about valid options, expected constructs, and required syntax for display, in contrast to existing tools which often require the user to know what to search for before the searched result is displayed.

Figure 1:
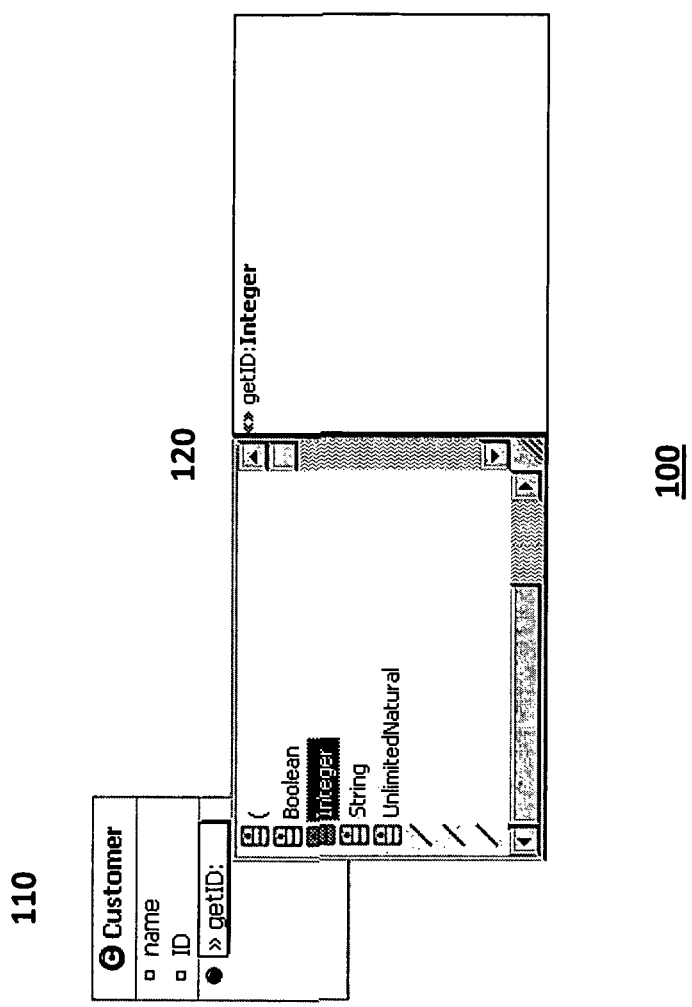
FIG. 1 presents a drop-down window display of a tool exemplar using the content assistance (i.e., content assist)
Figure 2:
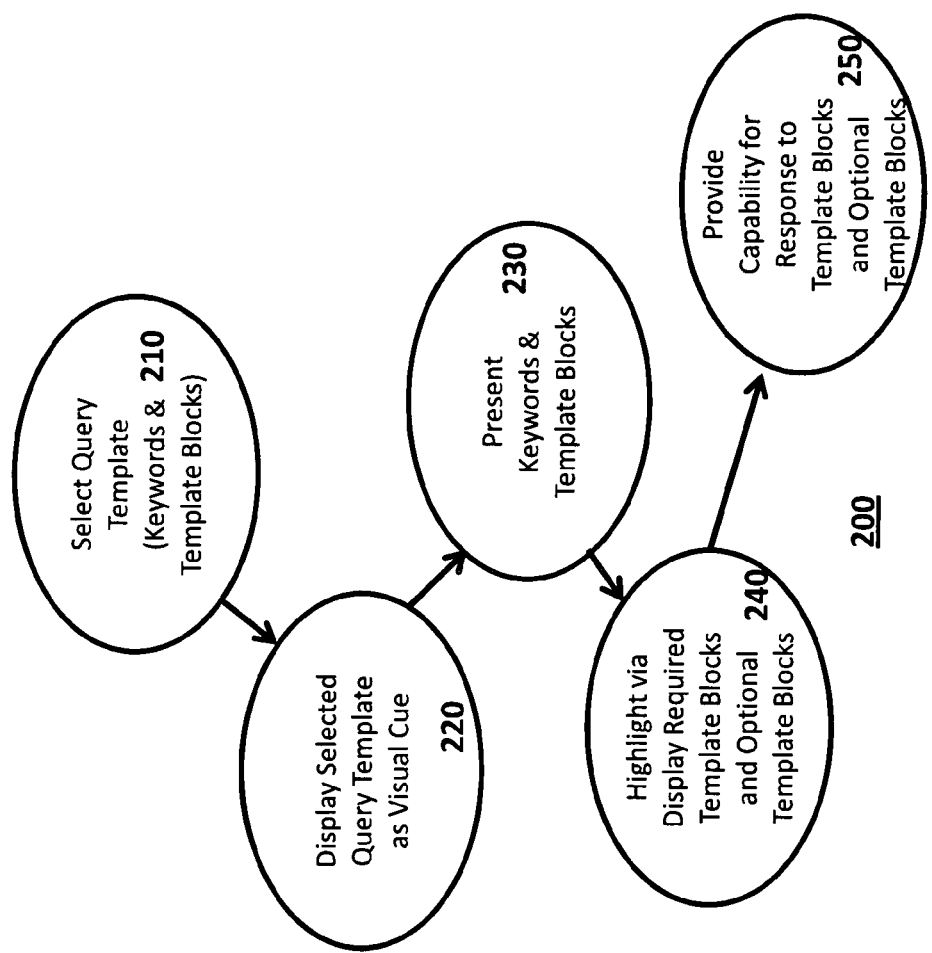
FIG. 2 presents a method of building a query using the present invention, in accordance with one implementation.

FIG. 2 presents a method of building a query using the present invention, in accordance with one implementation. From FIG. 2, in building a query, a user begins by selecting a basic query template 210 which reflects the goals of the query (e.g., such as output type), and the parameters of the query (e.g., such as data source type). It will be appreciated by those skilled in the art that each query template of the present invention may contain multiple "template blocks" held together by key words that are part of the query language. The keywords and template blocks are presented by display at 230. For example, the basic SQL "select" template, when adapted for the present invention in the query template may display: "SELECT [column] FROM [table] WHERE [condition]". The words in upper case are the query key words, and the words in blocks are the template blocks.

Once selected, the basic query template is displayed to the user at 220. Each template block of the query template of the present invention represents an expected (i.e., required) or optional query construct and presents keywords at 230. In a preferred arrangement, optional template blocks may be differentiated from the required template blocks by a number of form or physical factors including but not limited to color, font properties, etc. The Required template blocks and the optional template blocks are highlighted in the display to the user via the form or physical factor distinction at 240. A capability to accept a compliant response to the highlighted portions of the template blocks is provided for at 250, so that the when highlighted portions have been satisfied, the query is built and completed.

Each template block is a visual cue telling the user that something is required in the query, or may optionally be added to the query as needed. In a preferred implementation of the present invention, there is a color difference between those template blocks that represent required information and those that are optional.

Figure 3:
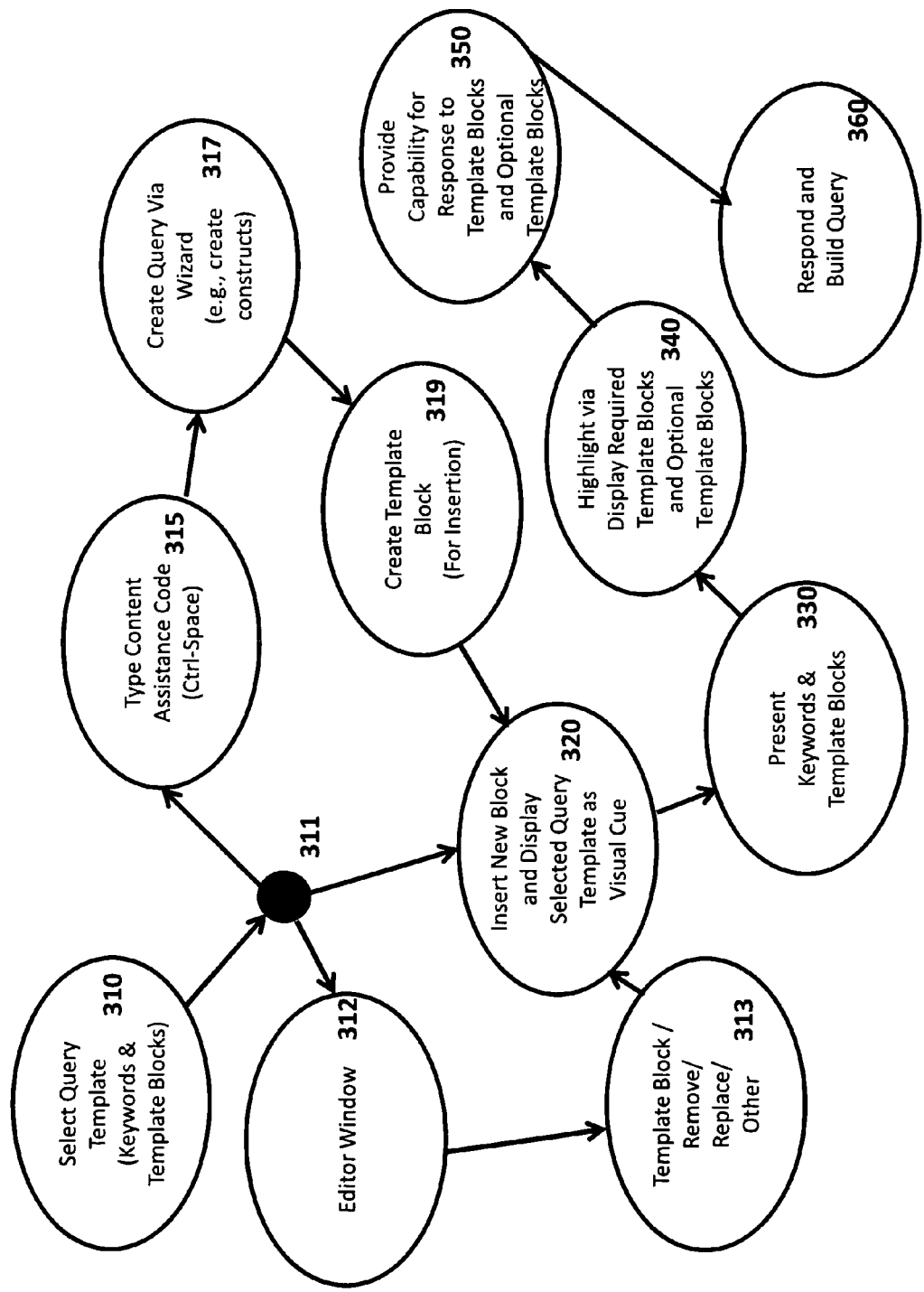
FIG. 3 presents a method of building a query using the present invention with a content assist mechanism in accordance with one implementation.

The present invention also may be used with the "content assist" mechanism (i.e., tool) available in many code editors today and more particularly, the template block of the present invention may be directly related thereto. The present invention provides an improvement to content assist tools as each template block of the present invention is an invocation point for content assistance. FIG. 3 presents a method of building a query 300 using the present invention with a content assist mechanism, in accordance with another implementation.

From FIG. 3, the user can select a template block at 310, elect to use a content assistant mechanism at 311, and type "CTRL-SPACE" at 315 to see a list of the valid options for that particular template block in the content assistant. After typing a content assistance code instantiator such as CTRL-SPACE (although other key sequences are understood to be included herein), an option might invoke a wizard at 317 responsible for creating the type of query construct represented tentatively by the template block.

For instance, some template blocks represent a class of query constructs. In this case, the content assist options available on that template block would allow the user to create the query constructs. When selected, a new construct would replace the template block in the query code at 319. In other situations, the newly created construct will itself be a template containing template blocks at 319. The newly created template is inserted in place of the original template block, and the new template blocks are displayed at 320.

For example, in the SQL select template, "SELECT [selection] FROM [source] WHERE [condition]", the content assistant options for the "[selection]" template block might include the following: "column, XML Query, sub-select" etc. Thereafter, using the present invention, selecting the "XML Query" option would replace the "[selection]" template block with the XMLQuery template including its template blocks, resulting in the following: "SELECT XMLQuery ([namespace;] [For or let] [where condition] [order by] return [result]) FROM [source] where [condition]". As used herein the template blocks within the query are context dependent, i.e., the blocks "know" one another.

For example, the content assist options available on the "[condition]" template block, in the select template are modified when selecting from an XML Query. In this situation, the query builder tool knows that a builder may likely desire to qualify the XML source before it is passed into the XMLQuery function, with the "XMLExists" function. For this reason, in a preferred implementation, content assist should list these options first when invoked on the "[condition]" template block.

In still other cases, a first template block is replaced by a single other template block of a more specific nature. For example, in the SQL select template, "SELECT [selection] FROM [source] WHERE [condition]", the content assist options for the "[source]" template block would include the following: "table, XMLTable, function" etc. Selecting the "function" option would replace the "[source]" template block with the "[function]" template block. In a preferred arrangement, as the user likely would desire to continue further, the present invention automatically invokes the content assist mechanism at 311 on the new "[function]" template block, thereby allowing the user to choose from a list of function types. The user then is able to select the desired function, and the function template is inserted in place of the template block. The new function template also contains template blocks as place-holders for the required, and optional function parameters.

Alternatively, the user may choose not to use the content assist mechanism associated with the template blocks with the method at 311 in accordance with another implementation. Instead, a choice to type directly into the editor window at 312 may be attended to using the present invention. Text entered before the template block is evaluated to determine what the text is, and then, if the text is determined to be a valid replacement to the template block, the template block is removed at 313.

Operatively, whether the content assist mechanism is selected or not at 311, once a template block is created and displayed at 320 as a visual cue, the keywords and template blocks are presented at 330, highlights are presented at 340, a capability to respond is provided at 350, and once compliant responses are received, the query is built and completed at 360.

Operatively, in a preferred arrangement, when the text cursor reaches a template block in the present invention, the template block is skipped. In this situation, if the user is moving the cursor from the left to the right (or right to left) by using the arrow keys, when the cursor reaches a template block, the block is selected (highlighted), but the cursor remains where it is (to the left of the template block or to the right if moving from right to left). With the template block selected, clicking the right-arrow key again moves the cursor to the other side of the template block (unselecting the template block). Preferably, with the template block selected, typing anything immediately replaces the template block. In a further preferred arrangement, selecting a template block can also invoke GUI tools related to the type of the selected template block. With the template block highlighted, clicking the 'tab' button moves the selection to the succeeding template block.

Figure 4:
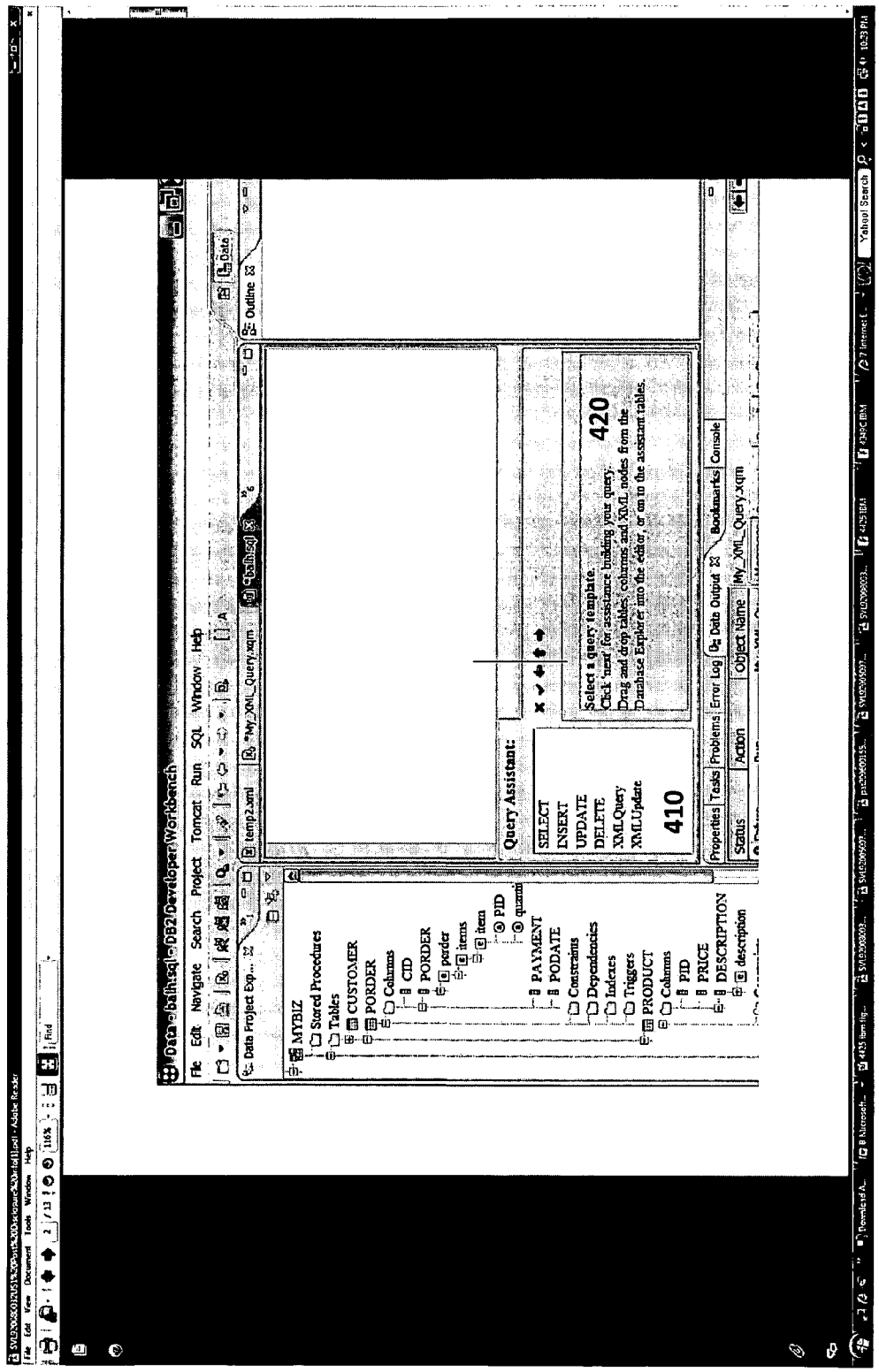
FIG. 4 presents a screen shot of a query template with functional blocks using the present invention in accordance with one implementation; and, FIG. 5 presents a screen shot of a query template with functional blocks and text using the present invention in accordance with one implementation.

FIG. 4 presents a screen shot 400 of a query template with functional blocks 410 using the present invention in accordance with one implementation. At 420, the explanation of the block for SELECT is presented to assist a user in a preferred implementation.

Figure 5:
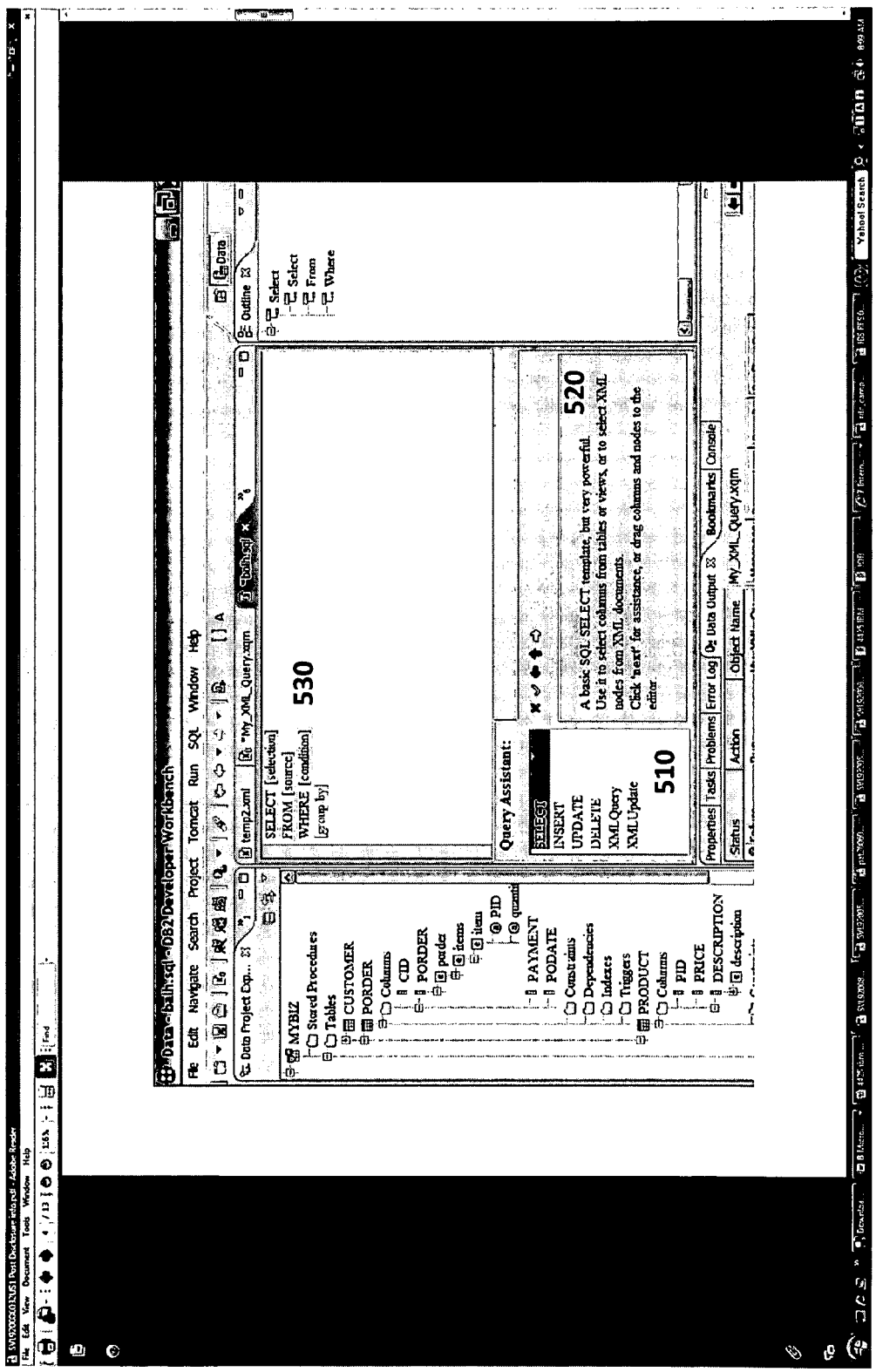

FIG. 5 presents a screen shot 500 of a query template with functional blocks 510 and text 530 using the present invention in accordance with one implementation. At 520, further explanation of the block selected for SELECT is presented to assist a user in a preferred implementation. Keywords are also presented on the screen at 530 in a preferred implementation.

The present invention then, in various implementations, provides for replacing template blocks with new templates containing new template blocks or replacing template blocks with more specific template blocks and query code, and permits the user to replace all of the required template blocks with query code. Operatively then, when all required template blocks of the present invention are replaced, the query is a valid query and can be run. The optional template blocks remain, as resident cues to help the user understand how the query can be expanded to meet new/different query goals. When the user advances in his query writing skills to the point where he no longer needs the template blocks cues, he can turn them off and see only the query code. It will be appreciated by those skilled in the art that the invention is not limited to optional template blocks but is also able to perform such for any of the template blocks, where a user may turn off all of the template blocks, optional and required, by example not by way of limitation.

The present invention may thus suitably be embodied, in full or in part, as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Additionally, it should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD-ROM, optical media), and communication media, such as computer and telephone networks including Ethernet, the Internet, wireless networks, and like network systems. It should be understood, therefore, in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware ad described herein or their equivalent.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of providing query templates having one or more functional template blocks to assist in building one or more queries, the method comprising:

providing for displaying one or more visual cues on a display, the one or more cues each having a valid option, an expected construct, and a required syntax;

providing for presenting one or more keywords to the display in relation to the one or more queries;

providing for selectively engaging a content assistance mechanism and a list of valid options to create a query construct represented by one of the one or more functional template blocks for each of the one or more queries, wherein invoking a wizard is an option in the list of valid options;

providing for highlighting at least one required template block in the display via a first form and highlighting at least one optional template block in the display via a second form;

providing for a capability to receive a response to the one or more functional template blocks and determining compliance of the response received; and, wherein each functional template block includes at least one required template block and at least one optional template block associated with the one or more queries.

2. The method of claim 1, further comprising providing a query following receiving responses sufficient to the one or more functional template blocks.

3. The method of claim 1, further comprising providing a plurality of option template blocks and highlighting at least one of the provided plurality option template blocks.

4. The method of claim 1, engaging a content assistance mechanism to create a query construct represented by a template block for each of the one or more queries.

5. The method of claim 1, further comprising inserting a newly created construct, being a template containing template blocks, in place of an original template block, and thereafter displaying.

6. A computer readable storage medium containing program instructions for displaying one or more visual cues on a display, the one or more cues each having one or more of a valid option, expected construct, and required syntax, wherein execution of program instructions by one or more processors of a computer causes the one or more processors to carry out the steps of:

providing for displaying one or more visual cues on a display, the one or more cues each having a valid option, an expected construct, and a required syntax;

providing for presenting one or more keywords to the display in relation to the one or more queries;

providing for selectively engaging a content assistance mechanism and a list of valid options to create a query construct represented by one of the one or more functional template blocks for each of the one or more queries, wherein invoking a wizard is an option in the list of valid options;

providing for highlighting at least one required template block in the display via a first form and highlighting at least one optional template block in the display via a second form;

providing for a capability to receive a response to the one or more functional template blocks and determining compliance of the response received; and, wherein each functional template block includes at least one required template block and at least one optional template block associated with the one or more queries.

7. The computer readable storage medium of claim 6, further comprising providing a query following receiving responses sufficient to the one or more functional template blocks.

8. The computer readable storage medium of claim 6, further comprising providing a plurality of option template blocks and highlighting at least one of the provided plurality option template blocks.

9. The computer readable storage medium of claim 6, engaging a content assistance mechanism to create a query construct represented by a template block for each of the one or more queries.

10. The computer readable storage medium of claim 6, further comprising inserting a newly created construct, being a template containing template blocks, in place of an original template block, and thereafter displaying.

* * * * *